United States Patent [19]

Stockmeyer

[11] Patent Number: 4,832,896
[45] Date of Patent: May 23, 1989

[54] METHOD FOR PRODUCING PLASTICS MATERIAL FILMS

[75] Inventor: Hans Stockmeyer, Isernhagen, Fed. Rep. of Germany

[73] Assignee: Hermann Berstorff Maschinenbau GmbH, Hanover, Fed. Rep. of Germany

[21] Appl. No.: 71,735

[22] Filed: Jul. 9, 1987

[30] Foreign Application Priority Data

Jul. 16, 1986 [DE] Fed. Rep. of Germany ....... 3623936

[51] Int. Cl.⁴ .............................................. B29C 43/24
[52] U.S. Cl. ................... 264/555; 264/175; 264/237; 425/72.1
[58] Field of Search ............... 264/175, 237, 500, 555, 264/556, 216, 212, 169; 425/72.1, 73–75

[56] References Cited

U.S. PATENT DOCUMENTS

| | | | |
|---|---|---|---|
| 2,437,680 | 3/1948 | Cornelius | 425/74 |
| 2,534,291 | 12/1950 | Moss | 264/175 |
| 3,159,696 | 12/1964 | Hodgson, Jr. | 264/556 |
| 3,999,911 | 12/1976 | Matsubara | 425/73 |
| 4,605,366 | 8/1986 | Lehmann et al. | 264/175 |
| 4,627,804 | 12/1986 | Kobayashi et al. | 264/212 |
| 4,668,463 | 5/1987 | Cancio et al. | 264/555 |

FOREIGN PATENT DOCUMENTS

| | | | |
|---|---|---|---|
| 52-72767 | 6/1977 | Japan | 264/212 |
| 56-113428 | 9/1981 | Japan | 264/175 |
| 894147 | 4/1962 | United Kingdom | 425/72.1 |
| 2159758A | 12/1985 | United Kingdom | 264/555 |

*Primary Examiner*—Jeffery Thurlow
*Attorney, Agent, or Firm*—Foley & Lardner, Schwartz, Jeffery, Schwaab, Mack, Blumenthal & Evans

[57] ABSTRACT

A method and apparatus are provided to prevent specks of condensation products being formed on a plastics material film produced by a calendering technique. In the method, after the film has left the final calender roller, the film is passed around at least one take-up roller and is blown against the shell of the roller by compressed air issuing from nozzles. While on the shell of the roller the film is cooled to a temperature below the condensation temperature of the volatile substances released from the surface of the film.

2 Claims, 1 Drawing Sheet

METHOD FOR PRODUCING PLASTICS MATERIAL FILMS

FIELD OF THE INVENTION

The present invention relates to a method and to an apparatus for preparing plastics material films. More particularly, but not exclusively, the present invention relates to a method and an apparatus for producing polyvinyl chloride films using a calendering technique.

BACKGROUND OF THE INVENTION AND PRIOR ART DISCUSSION

In the production of films, it is known to utilise a calendering device. After leaving the calendering device, the film is passed around one or more take-up rollers. However, German Offenlegungsschrift No. 2204426 discloses that, as the film is passed from the calender to the take-up rollers, wax and other materials from the polyvinyl chloride film are transferred to the take-up rollers.

These deposits formed on the take-up rollers are transferred to the film in the form of a layer having a specific thickness, and they produce specks of condensation product on the film. This phenomenon is known in the art as the so-called "plate-out effect".

In the above-mentioned German Offenlegungsschrift No. 2 204 426, it is suggested that this problem may be overcome by providing an additional metal roller which is coated with a highly absorbent paper. This additional roller is pressed directly against the take-up roller, without the film passing therebetween, and is driven or carried along by the take-up roller. The absorbent paper removes any condensation product from the take-up roller and, in consequence, the film passing over the take-up roller is not contaminated with deposits of condensation products.

In such an arrangement, the metal roller, which is coated with absorbent paper, must be replaced comparatively frequently in order to keep the paper sufficiently absorbent. This is a great inconvenience.

It is also known, from European Patent No. 0 172 924 A2, to keep a web of material in close contact with cooled rollers by directing compressed air thereagainst. The production of a so-called mouldable film is described in this prior specification, which film is retained against a cooling roller by means of an air nozzle immediately after the film has been discharged from a wide-slotted nozzle.

In U.S. Pat. No. 3,893,879, there is disclosed an apparatus for producing an undulatory multi-layered film which is compressed and pressed against a roller by means of compressed-air nozzles.

However, none of these prior art documents disclose any means for preventing the formation of specks of condensation products on films.

OBJECT OF THE INVENTION

The present invention seeks to provide a method of producing plastics material films, more especially polyvinyl chloride films, by a calendering technique but in which the formation of specks of condensation products on the film is prevented. Further, the present invention seeks to provide an apparatus which is suitable for carrying out such a method.

SUMMARY OF THE INVENTION

In accordance with the present invention, there is provided a method of producing plastics material films such as polyvinyl chloride films, by a calendering technique wherein the film is passed over take-up rollers after leaving the calender, in which the film is brought into direct contact with the shell of at least one of the take-up rollers by the action of compressed air directed against the film and, whilst said contact is maintained, cooling the film to a temperature below the condensation temperature of the volatile constituents released from the surface of the film.

Also in accordance with the present invention, there is provided an apparatus which is particularly suitable for carrying out such a method, the apparatus comprising a calendering device including a plurality of rollers and take-up rollers disposed downstream, in the direction of travel of the film, of the final calender roller wherein at least one of the take-up rollers has an air nozzle associated therewith, which nozzle extends over the entire length of the roller, said air nozzle being connected to a source of compressed air, and the nozzle opening being disposed immediately above the initial point of contact of the film with the take-up roller.

By utilising the method of the present invention, specks of condensation product are prevented from being formed. This is because the film web, which travels relatively rapidly from the calender to the take-up rollers, is maintained in direct contact with the shell of at least one of the take-up rollers by means of compressed air. The roller is at a lower temperature than the film. By maintaining the film in contact with the shell, the formation of a layer of air between the shell of the take-up roller and the film is prevented.

After leaving the calender, the film web is cooled because the film is in direct contact with the shell of the take-up roller. Accordingly, the temperature of the film rapidly traverses the evaporation and condensation temperature range of the volatile substances on the plastics material surface.

Since the film web rapidly traverses this critical temperature phase, the formation of condensation products is almost wholly prevented. It is, of course, in this temperature range that condensation products are formed. In practice, the film is transferred from the calender to the take-up rollers at a rate of 60 to 80 m/min. With the film travelling at this speed, and the film being pressed against the shell of the take-up roller by compressed air, the formation of an insulating layer or air between the film and the shell of the roller is prevented. It can therefore be seen that the direct contacting of the film with the first roller of the take-up means is achieved in the shortest possible time which ensures rapid cooling of the film to below the condensation temperature of the volatile components.

The method of the present invention obviates the need for providing means for cleaning the take-up rollers and the film. Moreover, it is also unnecessary to provide suction means beneath the take-up rollers to extract evaporated or vaporised substances emanating from the film as it leaves the calender.

The apparatus in accordance with the present invention ensures, on the one hand, that the formation of an insulating layer of air between the film web and the shell of the take-up roller is precluded and, on the other hand, that the film is in closer contact with the take-up rollers which have a lower temperature, whereby rapid cooling is achieved and the formation of specks of condensation product is prevented.

BRIEF DESCRIPTION OF THE DRAWINGS

One embodiment of an apparatus in accordance with the present invention and which is suitable for carrying out a method in accordance with the present invention will be further described, by way of example, with reference to the accompanying drawing, the single FIGURE (FIG. 1) of which shows, schematically, a side elevation of a portion of a calendering apparatus.

DESCRIPTION OF PREFERRED EMBODIMENT

Figure 1:
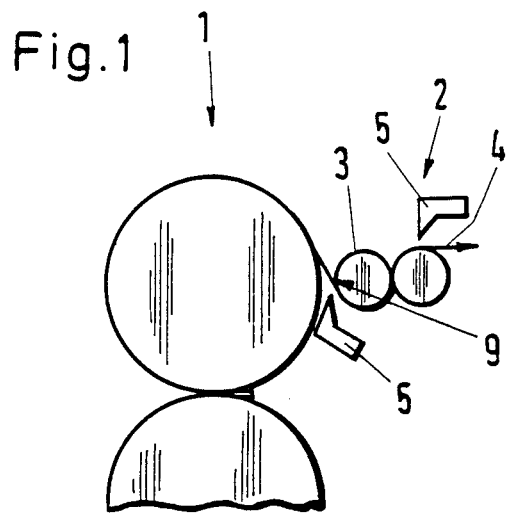

In the drawing, there is shown a calendering apparatus generally referenced 1. Associated with the apparatus 1 are take-up means 2 in the form of rollers 3.

A film produced by the apparatus 1 is passed around, in this embodiment by two take-up rollers 3 and is then subsequently passed to a tensioning apparatus (not shown). The take-up rollers 3 are each maintained at a desired temperature by means of known devices (not shown). Nozzles 5 are provided adjacent each take-up roller 3 through which compressed air is directed against the film passing over the rollers. The source of compressed air is not shown. In the case of the first take-up roller 3, the air outlet opening of the nozzle is directed towards the point 9 at which the film 4 encounters the roller 3.

Tests were then performed utilising the above-described apparatus. In the first test, no compressed air was blown against the film so as to utilise a prior art method. In the second test, compressed air was used. In both tests the calender rollers had a diameter of 650 mm. The take-up means 2 included take-up rollers 3 which were disposed with their axes disposed horizontally, on a level with the uppermost calender roller. The take-up rollers 3 each had a diameter of 150 mm and were each provided with conventional means for controlling the temperature of the shells of the rollers. A soft-set S-PVC film having a K value of 65 was then produced on the calender.

In the first or prior art test the film had a temperature of 192° C. on leaving the final calender roller. The shell of the first take-up roller was maintained at a temperature of 165° C. The film travelled round the take-up roller at a speed of 75 m/min. and, as stated hereinbefore, was not pressed against the roller by compressed air. The film had a temperature of 185° C. after leaving the take-up roller. A considerable amount of condensation products were formed on the film with the result that the take-up roller developed a wetted surface.

In the second test, in which the method in accordance with the present invention was employed, compressed air was directed from a nozzle 5 over the width of the first take-up roller encountered by the film 4 after leaving the final calender roller. The air was directed towards the film 4 travelling over the take-up roller 3 so as to provide direct contact between the film 4 and the roller 3 and to prevent the formation of an insulating layer of air between the film and the rapidly-rotating take-up roller. The roller shell, as in the first test, had a temperature of 165° C. The film had been cooled to a temperature of 170° C. on leaving the first take-up roller. Compressed air was also blown over the width of the second take-up roller in a similar manner but, for the purposes of this test, no account was taken of the results produced thereby.

As a consequence of pressing the film against one of the take-up rollers by means of the compressed air, no layer of air was formed between the shell of the take-up roller and the film. In addition, the film web was cooled by a further 15° C. in comparison with the prior art method. The evaporation and condensation temperature range of the volatile substances, such as plasticizers, stabilizers and lubricants, on the film surface was rapidly traversed utilising the method of the present invention and this ensured that no condensation product of any kind was formed. Accordingly, a speck-free film was obtained.

By utilising the method and apparatus of the present invention, it is possible to dispense with the cleaning rollers for cleaning residues of condensation products deposited on the take-up rollers, as have been necessary in prior art arrangements.

I claim:

1. A method of treating a polyvinyl chloride film of plastic material, which film is susceptible to releasing volatile constituents from the film's surface upon production thereof by a calendering technique and wherein said film is passed over at least one take-up roll after leaving the calender, which comprises:
   directing compressed air against said film at the point at which the film encounters the surface of the first of said at least one take-up roll so as to prevent the formation of an insulating layer of air between the film and the roll surface while contact between said film and roll is maintained, and thereafter rapidly cooling said film to a temperature below the condensation temperature of volatile substances released from the surface of the film during said calendering, the rate of cooling being such that the film temperature rapidly traverses the evaporation and condensation temperature range of the volatile substances on the film surface thereby preventing the formation of undesirable condensation products on said film.

2. The method according to claim 1, further including the step of passing said film over a second take-up roll, and directing compressed air against the surface of said film as it passes over said second take-up roll.

* * * * *